(12) United States Patent
Van Bree et al.

(10) Patent No.: US 9,740,914 B2
(45) Date of Patent: Aug. 22, 2017

(54) FACE LOCATION DETECTION

(71) Applicant: KONINKLIJKE PHILIPS N.V., Eindhoven (NL)

(72) Inventors: Karl Catharina Van Bree, Eindhoven (NL); Ruud Vlutters, Eindhoven (NL); Dmitry Nikolayevich Znamenskiy, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/413,718

(22) Filed: Jan. 24, 2017

(65) Prior Publication Data

US 2017/0132454 A1    May 11, 2017

Related U.S. Application Data

(63) Continuation of application No. 14/114,213, filed as application No. PCT/IB2012/052038 on Apr. 23, 2012, now Pat. No. 9,582,706.

(30) Foreign Application Priority Data

Apr. 28, 2011    (EP) .................................... 11164162

(51) Int. Cl.
*G06K 9/00*    (2006.01)
*G06T 15/50*    (2011.01)
*G06T 17/20*    (2006.01)

(52) U.S. Cl.
CPC ..... *G06K 9/00228* (2013.01); *G06K 9/00208* (2013.01); *G06T 15/50* (2013.01); *G06T 17/20* (2013.01)

(58) Field of Classification Search
None
See application file for complete search history.

(56) References Cited

U.S. PATENT DOCUMENTS 5,821,943 A    10/1998 Shashua
6,137,896 A    10/2000 Chang et al.
(Continued)

FOREIGN PATENT DOCUMENTS

CN    1607551 A    4/2005
CN    101377814 A    3/2009
(Continued)

OTHER PUBLICATIONS

Ming-Hsuan, Y. et al., "Detecting Faces in images: a Survey", IEEE Transactions on Pattern Analysis and Machine Intelligence, Issue Date : Jan. 2002, vol. 24, Issue: 1, pp. 34-58.
(Continued)

*Primary Examiner* — Sumati Lefkowitz
*Assistant Examiner* — David Perlman
(74) *Attorney, Agent, or Firm* — Michael W. Haas

(57) ABSTRACT

The location of a face is detected from data about a scene. A 3D surface model from is obtained from measurements of the scene. A 2D angle data image is generated from the 3D surface model. The angle data image is generated for a virtual lighting direction, the image representing angles between a ray directions from a virtual light source direction and normal to the 3D surface. A 2D face location algorithm is applied to each of the respective 2D images. In an embodiment respective 2D angle data images for a plurality of virtual lighting directions are generated and face locations detected from the respective 2D images are fused.

16 Claims, 2 Drawing Sheets

(56) References Cited

U.S. PATENT DOCUMENTS

| | | | |
|---|---|---|---|
| 7,436,988 | B2 | 10/2008 | Zhang et al. |
| 2003/0123713 | A1 | 7/2003 | Geng |
| 2004/0218070 | A1 | 11/2004 | Hamalainen ............ G06F 21/32 348/239 |
| 2004/0223631 | A1 | 11/2004 | Waupotitsch et al. |
| 2006/0039600 | A1 | 2/2006 | Solem et al. |
| 2006/0241808 | A1 | 10/2006 | Nakadai ............... G06K 9/0057 700/245 |
| 2007/0258656 | A1 | 11/2007 | Aarabi |
| 2009/0232363 | A1* | 9/2009 | Ohashi ............... G06K 9/00281 382/118 |
| 2010/0191541 | A1 | 7/2010 | Prokoski |
| 2014/0010418 | A1 | 1/2014 | Dey ........................ G06F 3/012 382/118 |

FOREIGN PATENT DOCUMENTS

| | | |
|---|---|---|
| EP | 1510973 A2 | 3/2005 |
| EP | 2031544 A1 | 3/2009 |
| JP | 2006502478 A | 1/2006 |
| JP | 2010277242 A | 12/2010 |
| WO | WO2004032061 A2 | 4/2004 |
| WO | WO2004066191 | 8/2004 |
| WO | WO2005038716 A1 | 4/2005 |
| WO | 2008130907 A1 | 10/2008 |

OTHER PUBLICATIONS

Fischer, J. et al., "Face Detection Using 3-D Time-of-Flight and Colour Cameras", ISR/ROBOTIK 2010u, Robotics (ISR), 2010 41st International Symposium, 2010 6th German Conference on Robotics (ROBOTIK) Jun. 7-9, 2010.
Nguyen, D. et al., "Real-time Sound Localization Using Field Programmable Gate Arrays", IEEE Transactions on Systems, Man, and Cybernetics, Part B, vol. 36, No. 4, Aug. 2006.
Bichsel, M. et al., "Human Face Recognition and the Face Image Sets Topology", The Media Laboratory, MIT, Cambridge, MA, USA, Avaialable online Apr. 26, 2002.
Feng, Shaolei et al., "Automatic Fetal Face Detection from Ultrasound Volumes Via Learning 3D and 2D Information", Computer Vision and Pattern Recognition, 2009. CVPR 2009. IEEE Conference on, Jun. 20-25, 2009, pp. 2488-2495.
Bo Gao, "3D Object Recognition ¿ Face Detection", Apr. 17, 2007, CSG120, Final Project Draft.
Amit et al, "A Computational Model for Visual Selection", Neural Computation, vol. 11, 1998, pp. 1691-1715.
Crow, "Summed-Area Tables for Texture Mapping", Proceedings of SIGGRAPH, vol. 18, No. 3, 1984, pp. 207-212.
Freeman et al, "The Design and Use of Steerable Filters", IEEE Transactions on Pattern Analysis and Machine Intelligence, vol. 13, No. 9, 1991, pp. 891-906.
Freund et al, "A Decision-Theoretic Generalization of On-Line Learning and an Application to Boosting", Computational Learning Theory: EUROCOLT, 1995, pp. 1-24.
Greenspan et al, "Overcomplete Steerable Pyramid Filters and Rotation Invariance", Proceedings of the IEEE Conference on Computer Vision and Pattern Recognition, 1994, pp. 1-7.
Itti et al, "A Model of Saliency-Based Visual Attention for Rapid Scene Analysis", IEEE Transactions on Pattern Analysis and Machin Intelligence, vol. 20, No. 11, 1998, pp. 1254-1259.
John et al, "Irrelevant Features and the Subset Selection Problem", Machine Learning"Proceedings of the Eleventh International Conference", 1994, pp. 1-9.
Osuna et al,"Training Support Vector Machines: An Application to Face Detection", Proceedings of the IEEE Conference on Computer Vision and Pattern Recognition, 1997, pp. 130-136.
Papageorgiou et al, "A General Framework for Object Detection", International Conference on Computer Vision, 1998, pp. 1-8.
Quinlan, "Induction of Decision Trees", Machine Learning 1, 1986, pp. 81-106.
Roth et al, "A Snowbased Face Detector", In Neural Information Processing, 2000, pp. 1-7.
Rowley et al, "Neural Network-Based Face Detection", IEEE (PAMI), 1998, vol. 20, pp. 1-27.
Schneiderman, "A Statistical Approach to 3D Object Detection Applied to Faces and Cars", Robotics Institute, Carnegie Mellon University, 2000, pp. 1-106.
Boxlets: A Fast Convolution Algorithm for Signal Processing and Neural Networks, Advances in Neural Information Processisng Systems, vol. 11, pp. 571-577.
Sun et al, "Example-Based Learning for View-Based Human Face Detection", IEEE Transactions on Pattern Analysis and Machine Intelligence, vol. 20, No. 1, 1998, pp. 39-51.
Tsotsos et al, "Modeling Visual Attention Via Selective Tuning", Artificial Intelligence, vol. 78, 1995, pp. 507-545.
Schapire et al, "Boosting the Margin: A New Explanation for the Effectiveness of Voting Methods", Machine Learning: Proceedings of the Fourteenth International Conference, 1997, pp. 1-9.
A. Borkowski et al., "Towards Semantic Navigation in Mobile Robotics", Nov. 1, 2010, Graph Transformations and Model-Driven Engineering, Springer Berlin Heidelberg, Berlin, Germany, pp. 719-748.
Li et al., "Handbook of Face Recognition Passage", Jan. 1, 2005, Springer, New York, US, pp. 5-10.
A. Nuchter et al., "Towards Semantic Maps for Mobile Robots"., Robotics and Autonomous systems, Elsevier Science Publishers, Amsterdam, NL, vol. 56, No. 11, Nov. 30, 2008, pp. 915-926.
M.P. Segundo et al, "Automatic Face Segmentation and Facial Landmark Detection in Range Images", IEEE Transactions Systems, Man and Cybernetics, Part B: Cybernetics, vol. 40, No. 5, Oct. 1, 2010, pp. 1319-1330.
Viola et al, "Robust Real-Time Face Detection", International Journal of Computer Vision 57(2), 2004, pp. 137-154.
M. Zhao, "Face Recognition Method Combining 3D Face Model with 2D Recognition", undated.

\* cited by examiner

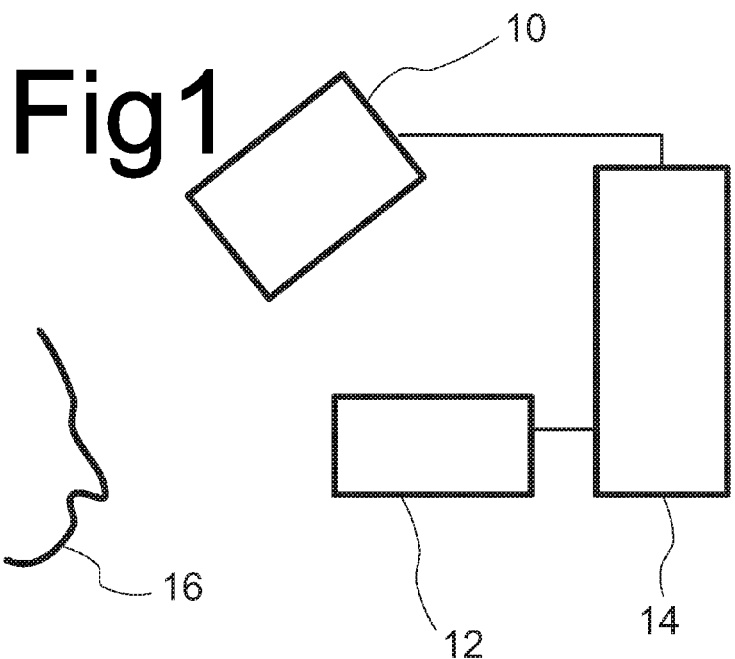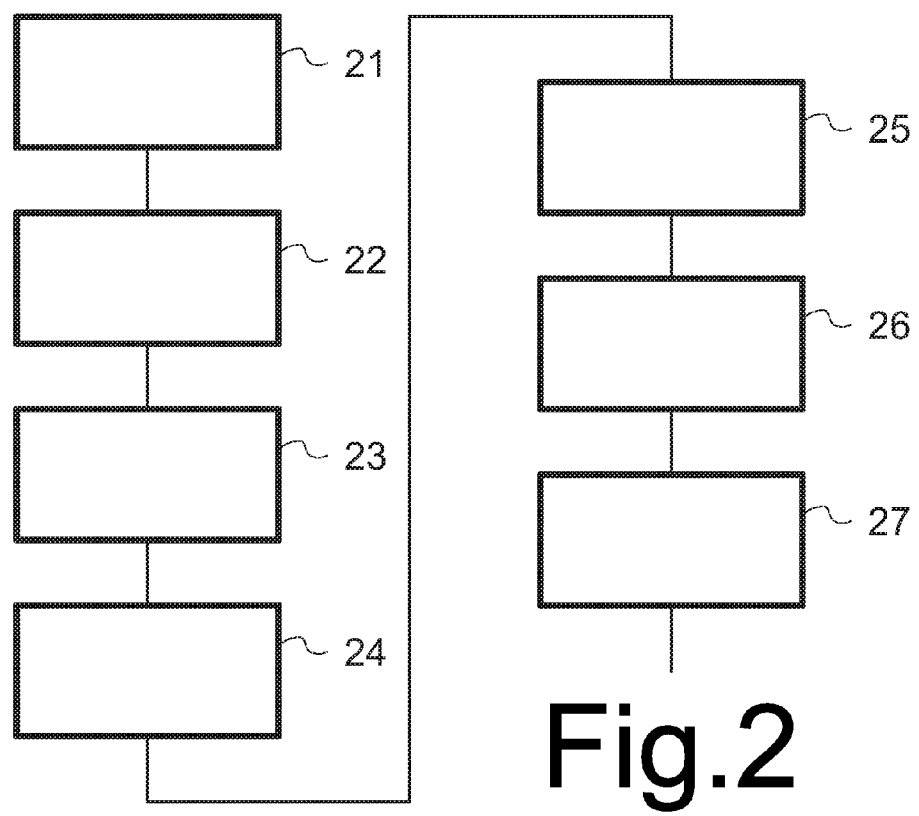

FACE LOCATION DETECTION

CROSS-REFERENCE TO RELATED APPLICATIONS

This application is a continuation of U.S. patent application Ser. No. 14/114,213, filed Oct. 27, 2013, which claims benefit under 35 U.S.C. §371 of International Application No. PCT/IB2012/052038 filed on Apr. 23, 2012, which claims the priority benefit of European Patent Application No. 11164162.7, field Apr. 28, 2011, the contents of which are herein incorporated by reference.

FIELD OF THE INVENTION

The invention relates to a system and method for determining the location of a face from measurements that produce a 3 dimensional surface model of a scene containing the face.

BACKGROUND OF THE INVENTION

U.S. Pat. No. 7,436,988 describes a face authentication and recognition method that uses 2 dimensional images to form a 3 dimensional model, and verification of the identity of a person by comparison of the 3 dimensional model with reference data. A face profile line is extracted from the intersection of the symmetry plane of the face with the 3D model and properties of this line are used for verification of the identity of a person. The symmetry plane is found by forming a mirrored version of the 3D model and positioning the original 3D model and the mirrored version relative to each other in a way results in a best match. The procedure for finding the symmetry plane implicitly determines information relating to the location of the face, on the assumption that the face is the only substantially symmetric object in the modeled space. However, U.S. Pat. No. 7,436,988 does not discuss the problem of location determination.

Face recognition and face location determination are different tasks that involve different considerations. Face recognition is inherently person specific: the essence of face recognition is that different persons should be distinguished. Face location determination, on the other hand, is preferably person independent: the location should be determined independent of the unique personal features of the face.

SUMMARY OF THE INVENTION

Among others, it is an object to provide for system and method for determining the location of a face from a 3 dimensional model of a scene containing the face.

A method according to claim 1 is provided. Herein a 3D surface model of a scene containing a face is used as a starting point for face localization, i.e. detection of the location of a face in a scene. The 3D surface model may be derived from 2D optical imaging for example. From the 3D surface model a 2D angle data image is generated, which represents angle data, of angles between normals to the modeled 3D surface and incidence directions according to a direction of a virtual light source. The angle data image is used in the execution of a 2D face location algorithm.

In this way, an available and tested 2D face location algorithm can be used for determination of the face location in a 3D model. Reliable measurements of optical surface properties of the face is not needed. Even if the 3D surface model is derived from 2D optical images, use of the 3D surface model makes face location detection more robust against the effects of reflection properties and color of the surface. Preferably, the pixel values of the generated 2D image are determined only from geometric information about the modeled 3D surface at 3D points that are in view at respective pixel locations of the generated 2D image, without using non-geometric optical properties.

In an embodiment a plurality of respective 2D images with angle data for respective different virtual lighting directions is generated and the face location detection algorithm is applied to each of the respective 2D images. The resulting location detections may be combined to provide a detected face location. The resulting location detections may be fused for example by taking the average of detected positions for different directions, optionally after removing outliers or by selecting a median or other representative one of the detected positions for different directions. Combination may also include a clustering step, involving assignment of location detections to selected clusters and fusing location detections within a cluster.

In an embodiment a plurality of 2D images is generated for a same viewing direction for said respective directions. In this way, the method is made more robust. Moreover it is made possible to determine averages of the face location in the 2D images. Alternatively, arbitrary combinations of viewing direction for said respective directions may be used. In an embodiment images for a plurality of different viewing direction are generated. This makes the method robust against variation of the rotation of the face.

In an embodiment the 2D face localization algorithm may comprise determining a plurality of sums of the angle data over respective regions in the image, comparing the sums with thresholds and combining the results of said comparisons.

A successful algorithm for face location determination from 2 dimensional images is known from an article by Viola et al, titled "Robust Real-Time Face Detection", published in the International Journal of Computer Vision 57(2), 2004 pages 137-154. Viola et al use a combination of sums of pixel values in various rectangular image areas to decide the location of a face. The combination of rectangular image areas is set by means of computer learning. In a learning phase, the system is presented with a large collection of examples and counterexamples of faces and a large collection of rectangles of different size and position that may be used. The AdaBoost computer learning technique is used to select a combination of rectangles that provides robust results. The algorithm described by Viola et al may be used for example, using training results for 2D images, without having to go through a new training procedure.

The 3D surface model may be obtained from a storage device where it has been stored after it has been generated. In an embodiment information from one or more 2D images of light received from the scene is used to obtain the 3D surface model. Structured light may be used to light the scene. By first converting this information to a 3D surface model and then converting back to 2D images wherein surface orientation rather than direct optical image properties are used, the method makes it unnecessary to obtain reliable information about the optical surface properties of the face. Alternatively, other measuring techniques, such as 3D tomographic techniques may be used to obtain the 3D surface, for example indirectly from a 3D volumetric model.

BRIEF DESCRIPTION OF THE DRAWING

These and other objects and advantageous aspects will become apparent from a description of exemplary embodiments, using the following figures.

FIG. 1 shows a face data processing system

FIG. 2 shows a flow chart of face location determination

DETAILED DESCRIPTION OF EXEMPLARY EMBODIMENTS

Figure 3:
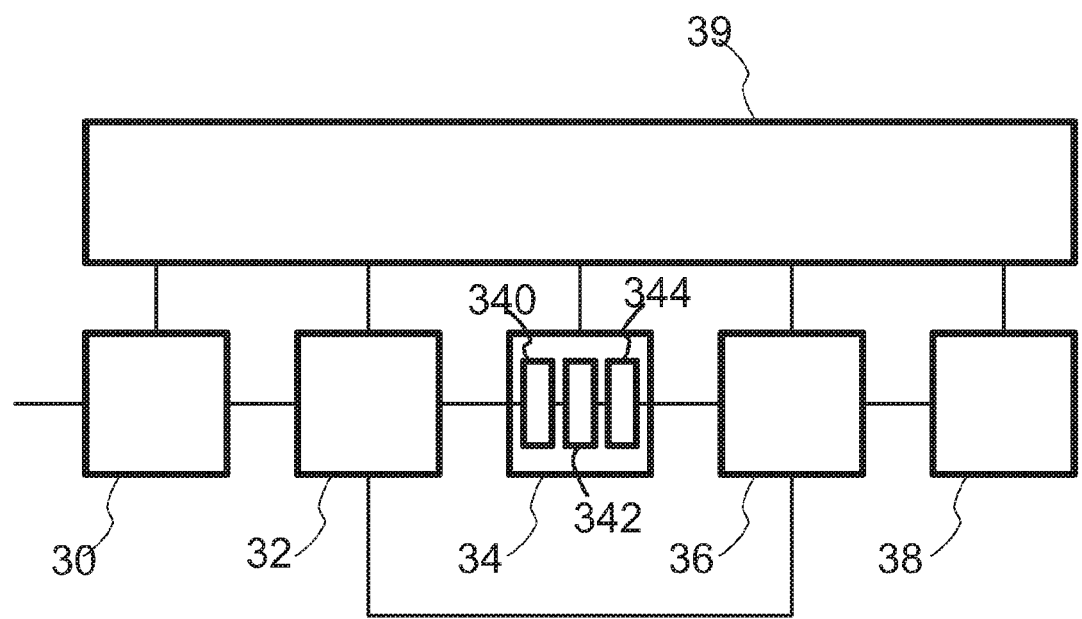
FIG. 3 shows a processing architecture

FIG. 1 shows a face data processing system, comprising a structured light source 10, a camera 12 and a processor 14. Structured light source 10 and camera 12 is coupled to processor 14. Although structured light source 10 and camera 12 are shown by way of example, it should be appreciated that other devices for capturing 3D geometric information may be used. The structured light source 10 may be configured to project an array of dots or stripes onto an object, i.e. to transmit light only in an array of mutually separate ray directions, or an array of mutually separate ray planes. Structured light source 10 may be configured to realize the projection by means of dynamical scanning along a pattern of directions or using projection through a static mask for example.

An operational configuration is shown, wherein structured light source 10 and camera 12 are directed at a scene that contains a face 16. In operation structured light source 10 illuminates a scene with a structured light pattern or patterns and camera 12 captures an image of the scene while it is illuminated by structured light source 10. Structured light source 10 supplies information representing one or more resulting images to processor 14.

Processor 14 processes the image or images to form a 3D surface model of the scene. Methods for doing so are known per se. Processor 14 may be a programmable processor, comprising a computer program to make processor 14 do this. Processor 14 may in fact be a processing system, comprising a plurality of computers that perform different parts of the tasks that processor 14 is configured to perform. As used herein, processor 14 will be said to be configured to perform operations when it has a program that will make it perform these operations. However, processor 14 will also be said to be configured to perform operations if it contains dedicated circuits designed to perform the operations.

Processor 14 may be configured to detect pixel locations where surface points in the scene are visible that are illuminated by light from structured light source 10. Furthermore, processor 14 may be configured to identify for each such pixel the position of the illuminating light within the pattern of structured light from structured light source 10. Given the camera pose and the geometry of structured light source 10, the position in the pattern and the pixel position each define a ray direction in 3D space, the directions intersecting at the illuminated object point. Processor 14 computes the 3D coordinates of the object points from the pixel positions and the positions in the pattern.

Processor 14 may approximate the surface of the object by interpolation between the computed positions, e.g. by approximating the surface between neighboring detected points as planar triangles. From such an interpolation interpolated 3D coordinates of any surface points can be determined, as well as the surface normal at those surface points. Such determinations can be applied to pixels of the image captured by camera 12, but also to virtual images obtainable from other camera poses. Processor 14 is configured to use this information to determine the location of a face in 3D space.

FIG. 2 shows a flow chart of a process for determining the face location. The flow chart will be described in terms of actions performed by processor 14. It should be understood that processor 14 is "configured" to perform these actions. In a first step 21, processor 14 selects a first direction relative to the 3D model. The selected first direction will be called a virtual camera direction. In an embodiment the first direction may correspond to the direction of camera 12.

In a second step 22, processor 14 defines an image comprising an array of pixels. The array of pixels is associated with an array of ray paths having directions defined relative to the selected first direction. Processor 14 uses the 3D surface model obtained from structured lighting to determines for each pixel the 3D point of intersection of the ray path for that pixel with the 3D surface and the normal of the surface at that 3D point.

In a third step 23, processor 14 selects a second direction relative to the 3D model. The selected second direction will be called a virtual light source direction. (It should be emphasized that the words virtual light source direction are used only as a label for this direction, without implying that a virtual light source must be used to generate images, or that the generated images represent images that could be obtained with a specific light source).

In a fourth step 24 processor 14 determines angles between the second direction and the normals for the respective pixel, or at least processor 14 determines quantities that are a function of the angle, such as cosines of the angles. The angle or quantity that is a function of the angle will be called angle data. The angle data associated with respective positions in the image forms an angle data image. In an embodiment, angles with the derived directions that are all the same as the second direction may be used for each of the image positions, simulating the angles with rays from a virtual illumination source at infinity. Alternatively, angles with directions that are derived indirectly from the second direction may be determined. The derived directions may be determined for example by assuming a source point on a line from the scene along the second direction, determining lines from that source point to respective 3D points that are visible at respective positions in a 2D image plane and using the directions of these lines as the derived directions. Typically, the angle data is indicative of the angle, so that the angles could be determined from the angle data without requiring knowledge of optical surface properties.

In a fifth step 25, processor 14 applies a 2D face location detection algorithm to the angle data. A conventional algorithm, such as the algorithm described by Viola at al may be used, using combinations of detector rectangles that have been selected by training on normal 2D camera images (showing light intensity). A standard combination of detector rectangles may be used that is available from training the detection algorithms with 2D camera images. Briefly, the 2D face location detection algorithm may comprise determining respective sums of the angle data for each detector rectangle in a predetermined set of detector rectangles in the image. The respective sums may be computed by incrementally determining successive reference sums for respective pixel locations, the reference sum for each pixel location being a sum of pixel values in a rectangle with that pixel location and a corner of the image as diagonally opposed corners. The determination of the reference sums may be followed by selecting the reference sum values V(LL), V(LR), V(UL), V(UR) for the corners (LL=Lower Left etc to UR=Upper Right) of a detector rectangle and subtracting sums of the reference sum values for pairs of diagonally opposing corners of the detector rectangles. Although an example has been given for rectangles, it should be appreciated that a similar technique can be applied for regions of other shapes, such as parallelograms, by using reference sums for other shapes from pixel locations to the corner of the image with different shapes. Processor 14 may then compare the sums for the detector triangles with respective predetermined thresholds (which may have been obtained by learning) and combine the results of the comparisons to form a detection result. The detection result indicates at least a 2D central pixel location of a detected face in the image, if any.

Third to fifth steps 23-25 may be repeated for different selections of the second directions. In a sixth step 26, processor 14 determines whether a predetermined number of second directions have been selected. If not, processor 14 repeats from third step 23 for a new second direction. When the steps have been performed for the predetermined number of second directions, processor 14 proceeds to seventh step 27.

In a seventh step 27, processor 14 combines the results obtained for different second directions. The combination may be realized by fusion of the results. In an embodiment fusion may involve determining a median value of the 2D central pixel locations determined for different second directions and using the median as the fused detection result. Alternatively, an average may be computed, optionally after removing outliers. These and other techniques for fusing a plurality of results for a same measured parameter are known per se. In this case combination of the detection results produces a nominal pixel position, which is a median or average pixel position, or similar result of combining a plurality of 2D locations and rectangle sizes. Subsequently, processor 14 determines the 3D position associated with the nominal pixel location. In another embodiment, respective 3D positions may be determined for 2D images with different individual second directions and the respective 3D positions may be used to determine a nominal 3D position. The combining of seventh step 27 may also include clustering. Clustering techniques, such as the k-means algorithm are known per se, and may involve determining a plurality of nominal face locations for respective clusters, assigning each detected face location to the cluster with the closest nominal face location and fusing the detected face location that have been assigned to a same cluster to produce the combined result.

In the methods described by means of the flow-chart of FIG. 2 a 3D face location is preferably determined without using conventional image information (dependent on light intensity and object reflectivity) in the 2D location determination. The 3D surface model may be a purely geometric model, which defines only spatial locations and direction vectors, The direction vectors in the 3D model may be the result of measurements, or they may be defined by interpolation. If the 3D model contains optical reflectivity information (e.g. reflection coefficients, possibly as a function of wavelength of diffuse or even specular light reflection), this information may be ignored in the generation of the 2D images for 2D face location detection.

Of course, light intensity and object reflectivity may play a role in the formation of the camera image during illumination with structured light, but this information is lost in the 3D surface model that is used in second to fourth steps 22-24, where only geometric information is used. Avoidance of the use of such conventional image information makes face location detection more independent of differences between individual faces, such as face color. In contrast to face recognition, suppression of individuality is advantageous for face location detection. At the same time, use of images of angle data makes it possible to use conventional 2D face location detection algorithms without extensive learning and use of a plurality of second directions makes the method robust against effects of face rotation.

Processor 14 is configured to perform the described steps for example under control of a computer program, or by using electronic circuits designed to perform the steps, or by using a mix of a computer program and circuits, performing respective parts of the steps.

Although an embodiment has been described wherein a plurality of 2D images for a plurality of first and/or second directions are generated and used for face location detection, it should be appreciated that face location detection from a single 2D images for a specific first and second direction may suffice. In this case the detected 2D face location can be converted to a 3D location by means of information about the 3D surface model point that was images to the detected 2D face location. Use of a plurality of virtual lighting directions makes the method robust against dependence on virtual lighting direction.

FIG. 3 shows an embodiment of the architecture of processor 14 comprising a 3D surface model generator 30, a 2D image generator 32, a 2D face location detector 34, a data combiner 36, a 2D-3D convertor 38 and a control module 39. 3D surface model generator 30 has an input for receiving 2D image data from the camera (not shown) and an output for supplying 3D surface model data. 2D image generator 32 has an input coupled to the output of 3D surface model generator 30 and outputs for outputting a 2D angle data image and a 2D image of 3D coordinates (or depth data). 2D face location detector 34 has an input coupled to the output for the 2D angle data image. An embodiment is shown wherein 2D face location detector 34 comprises a summer 340, a comparator 342 and a combination module 344 coupled in series.

2D face location detector 34 has an output for outputting information representing a detection result, including information indicating a detected face location and/or face region in its input image. Data combiner 36 has an input for receiving the information indicating the detected face location and/or face region and an output for outputting information indicating a nominal location and/or region. Data combiner 36 may be a data fuser. As used herein, fusing is any operation that combines different data about the same parameter to determine a value of the parameter, including for example averaging detected face location and/or locations of face regions (as used here, average is used broadly, including a mean value, a median value, or an mean value obtained after eliminating outliers). A data combiner is a module, for example a program module that combines data in this way. In the embodiment wherein a single first and second direction is used, data combiner 36 may be omitted.

2D-3D convertor has inputs coupled to the output for outputting information indicating an average detected face location and/or face region and to the output of 2D image generator 32 for outputting the 2D image of 3D coordinates (or depth data). Control module 39 is coupled to 3D surface model generator 30, 2D image generator 32, 2D face location detector 34, averaging module 36, and 2D-3D convertor. Control module 39 is configured to make 2D image generator 32 generate images for a plurality of angles from the same 3D surface model and to make averaging module 36 determine an average (i.e. a mean value or a median value) from 2D face detection results for the plurality of angles. As explained, the various elements of the architecture may be software modules executed by a programmable processor, or electronic circuits or a combination thereof. The elements perform the steps of the flow-chart of FIG. 2: control module 39 may perform first, third and sixth steps 21, 23, 26, 2D image generator 32 may perform second and fourth steps 22, 24, 2D face location detector 34 may perform fifth step 25 and data combiner 36 may perform seventh step 27. Not all steps need be performed in the same device. For example 3D surface model generator 30 may be performed in one device on-line during 2D image capture and then supplied from that device to another device that contains the other elements of FIG. 3, for off-line processing.

In an embodiment first to seventh step 21-27 may be repeated for a plurality of different selected first directions. In this way a plurality of 3D positions associated with nominal pixel locations for different second direction is determined. From these 3D positions a nominal 3D position may be determined (e.g. a median or average of the 3D positions for different first directions). In an embodiment, the same first direction may be used for each of the image positions, simulating a virtual camera at infinity. Alternatively, derivative first directions may be used that are derived from the first direction. The derived directions may be determined for example by assuming a view point on a line from the scene along the first direction, determining lines from that view point through 2D positions in an imaging plane and using intersections of those lines with the modeled 3D surface as surface points.

When 3D positions are determined from nominal detected face locations for a plurality of 2D images obtained with the same second direction, the nominal detected face location may be determined in 2D before determining the 3D surface location associated with this nominal 2D surface location. When 3D positions are determined from the face location detections for individual 2D images, and the nominal location is determined subsequently in 3D it is not necessary to have sets of 2D images obtained with the same second direction: first and third step 21, 23 may be combined to select pairs of first and second directions in any way.

In an embodiment, a 2D face location detection algorithm that outputs detected face location in the form of indications of 2D image regions wherein faces have been detected may be used in fifth step 25. An indication of a 2D image region may indicate a rectangle with edges at the upper, lower, left and right sides of the detected face for example. In this embodiment processor 14 may be configured to us a centre point of the rectangle as the detected face location. These may each be used as a single detected face location.

Furthermore, processor 14 may be configured to use the indication of a 2D image region to determine a 3D surface region wherein a face has been detected, for example from the 3D coordinates associated with pixel locations within the indicated 2D image region, or from the 3D coordinates associated with pixel locations along a boundary of the indicated 2D image region. In an embodiment, processor 14 is configured to determine a nominal 2D image region for a detected face from the indicated 2D image regions obtained with respective second directions, for example by determine median or average values of the positions of edges of rectangular regions, or taking medians or averages of the distance to the boundary from the nominal centre position.

The described steps may be followed by further steps to determine the orientation, boundary and/or size of the face. Processor 14 may be configured to use the 3D face location in a further step to determine a search area for performing a search for the location of features of the face, such as a nose, a mouth and eyes. The locations of such features may be used to determine face orientation and/or size.

While the exemplary embodiments have been illustrated and described in detail in the drawings and foregoing description, such illustration and description are to be considered illustrative or exemplary and not restrictive; the invention is not limited to the disclosed embodiments.

Although an embodiment has been shown wherein structured light is used to obtain the 3D surface model, it should be appreciated that other techniques may be used to obtain such a model. For example a stereoscopic technique may be used, wherein images from a plurality of cameras at different locations are used, or an SLAM technique may be used, wherein a plurality of images from the same moving camera is used to derive a 3D surface model. A depth imaging camera (range camera) may be used that is configured to form an image based on 'time of flight' measurement if a plurality of directions corresponding to respective pixels. Non-optical techniques, such as nuclear magnetic imaging, ultrasound echography, X-ray tomography may be used as alternatives. When a volumetric technique is used, the resulting volumetric model may be used to derive the 3D surface model. In an embodiment wherein the 3D surface model is derived from 2D camera images, the first direction is selected equal to the viewing direction of one or more of the 2D camera images. In this case the angles with the normals defined by the 3D surface model are used to generate images for face location detection instead of, or in addition to the original 2D camera image of observed light intensity from the same viewing direction.

The 3D surface model may be stored in a storage device (e.g. a magnetic disk or a semi-conductor memory) from where it may be read in order to obtain it for the described face location detection. Alternatively the 3D surface model may be obtained directly from measurements when face location detection is performed or it may be obtained by deriving the 3D surface model from 2D images or a volumetric model when face location detection is performed.

Dependent on the desired application the resulting detected 3D face location may be used in different ways. It may be used to perform a face recognition algorithm to verify or find the identity of a person from the 3D surface model for example. As another example it may serve as input for further processing of the 3D surface model, such as the determination of the shape of a mask to be fitted over the face and selection of a suitable mask from a predetermined set of mask or control of manufacture of such a mask. As another example it may be used to control processing of volumetric data such as an NMI image, for example to control the location of 3D regions in the volumetric model for which measurements are obtained.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An image processing method wherein a location of a face is detected, the method comprising
 obtaining a 3D surface model from measurements of a scene;
 generating a 2D image of angle data from the 3D surface model, the 2D image including the angle data, the angle data for each respective image point in the 2D image being an angle between an incidence direction derived from a virtual lighting direction and a normal to the 3D surface at a point on the 3D surface that is in view in the 2D image at the image point or a trigonometric function of the angle;
 applying a 2D face location algorithm to the 2D image, wherein the 2D face location detection algorithm performs calculations on the angle data.

2. A method according to claim 1, comprising
 generating a plurality of respective 2D images from the 3D surface model, each representing the angle data for a respective virtual lighting direction;
 applying the 2D face location algorithm to each of the respective 2D images;
 combining face locations detected from the respective 2D images.

3. A method according to claim 2, comprising generating a plurality of said respective 2D images for a same viewing direction for said respective virtual lighting directions.

4. A method according to claim 3, comprising generating respective pluralities of said respective 2D images from, each plurality from a different viewing direction, each plurality comprising respective 2D images for a plurality of mutually different respective virtual lighting directions.

5. A method according to claim 3, comprising determining an average detected 2D location for said plurality of respective 2D images and determining a 3D surface location associated with said average detected 2D location according to the 3D surface model.

6. A method according to claim 1, wherein applying said 2D face location algorithm comprises determining a plurality of sums of the angles over respective regions in the image, comparing the sums with thresholds and combining the results of said comparisons.

7. A method according to claim 2, comprising determining respective 3D surface locations associated with respective detected 2D face locations according to the 3D surface model and determining an average of the respective 3D surface locations.

8. A method according to claim 1, wherein the 3D surface model is obtained using information from one or more further 2D images of light received from the scene.

9. A method according to claim 8, comprising lighting the scene by means of structured light.

10. A method according to claim 8, wherein the respective 2D images are generated for a viewing direction corresponding to a viewing direction of the one or more further 2D images of light received from the scene.

11. A method according to claim 8, wherein the respective 2D images are generated independent of light reflection properties associated with the points on the 3D surface, if any.

12. A method according to claim 1, comprising using a face location detected by the 2D face location algorithm and the 3D surface model to determine a 3D location of a point on the 3D surface that is visible at the detected face location.

13. A computer program product, comprising a non-transitory storage medium having stored thereon a program of instructions for a programmable processor that, when executed by the programmable processor, will cause the programmable processor to perform the method of claim 1.

14. An image processing system, the system comprising
 a 2D image generator configured to generate a number of 2D images from a 3D surface model obtained for a scene, the 2D images representing angle data, the angle data for each respective image point in the 2D image being an angle between an incidence direction derived from a virtual lighting direction and a normal to the 3D surface at a point on the 3D surface that is in view in the image at the image point or a trigonometric function of the angle;
 a 2D face location detector configured to apply a 2D face location detection algorithm to each of the respective 2D images, wherein the 2D face location detection algorithm performs calculations on the angle data.

15. An image processing system according to claim 14, wherein the 2D image generator is configured to generate a plurality of respective 2D images from the 3D surface model, each respective 2D image representing the angle data for a respective virtual lighting direction, the image processing system comprising a data combiner configured to combine face location detection results detected by 2D face location detector from the plurality of respective 2D images.

16. An image processing system according to claim 14, comprising a camera and a 3D model generator configured to generate the 3D surface model using image data from said camera.

* * * * *